United States Patent [19]

Bartolini

[11] Patent Number: 4,457,051
[45] Date of Patent: Jul. 3, 1984

[54] SLIDER FOR RIBBONS AND ASSEMBLING PROCESS THEREOF

[75] Inventor: Dario Bartolini, Impruneta, Italy

[73] Assignee: Lovable Industriale S.p.A., Bergamo, Italy

[21] Appl. No.: 313,988

[22] Filed: Oct. 22, 1981

Related U.S. Application Data

[62] Division of Ser. No. 968,187, Dec. 11, 1978, Pat. No. 4,315,351.

[51] Int. Cl.³ .............................................. A44C 5/18
[52] U.S. Cl. .................................. 24/198; 24/265 R; 24/90 HA
[58] Field of Search ............... 24/68 R, 90 HA, 265, 24/198, 201 A, 200, 201 R

[56] References Cited

U.S. PATENT DOCUMENTS

| | | |
|---|---|---|
| 1,429,139 | 9/1922 | Heberling . |
| 1,873,371 | 8/1932 | Ford . |
| 2,029,413 | 2/1936 | Davis . |
| 2,781,569 | 2/1957 | Eilertsen .......................... 24/265 R |
| 3,276,088 | 10/1966 | Block et al. . |
| 3,416,196 | 12/1968 | Mathison .......................... 24/90 HA |
| 3,434,185 | 3/1969 | Price . |
| 3,448,464 | 6/1969 | Jonas . |
| 3,462,803 | 8/1969 | Horton ............................ 24/90 HA |
| 4,161,420 | 7/1979 | Clarke et al. .................... 24/201 HE |

FOREIGN PATENT DOCUMENTS

| | | |
|---|---|---|
| 418040 | 8/1967 | Australia . |
| 1159304 | 6/1958 | France . |
| 1341729 | 9/1963 | France . |
| 2082494 | 12/1971 | France . |
| 2285090 | 4/1976 | France . |
| 52-31075 | 2/1973 | Japan . |
| 51-158805 | 6/1975 | Japan . |
| 51-158806 | 6/1975 | Japan . |
| 79703 | 11/1919 | Switzerland . |
| 382063 | 11/1964 | Switzerland . |
| 341464 | 5/1963 | U.S.S.R. . |

*Primary Examiner*—Gene Mancene
*Assistant Examiner*—James Hakomaki
*Attorney, Agent, or Firm*—Young & Thompson

[57] ABSTRACT

A slider to be applied to ribbons for clothing articles comprising a first portion and a second portion integral with the first portion. The first portion on a surface thereof is provided with projections for ultrasonic welding to a ribbon. The second portion has two slots that slidingly receive a ribbon, these slots being separated by two confronting, resiliently flexible arms. In the assembling process the slider is first secured to the end of a ribbon by welding, generally ultrasonic welding; then a punch moving transversely of the arms pushes a length of the ribbon beyond the arms, simultaneously flexing the arms. When the punch retracts, the arms spring back to their undeformed condition and the ribbon is left astride the arms.

4 Claims, 24 Drawing Figures

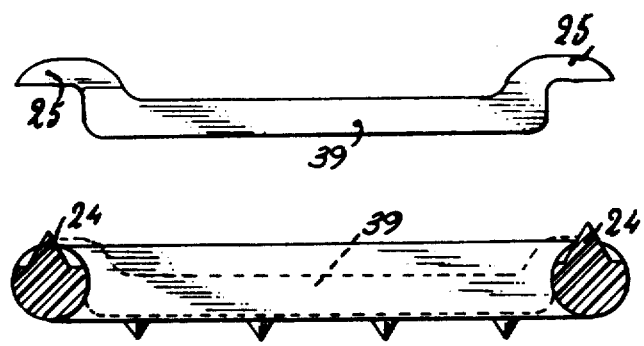
FIG.18
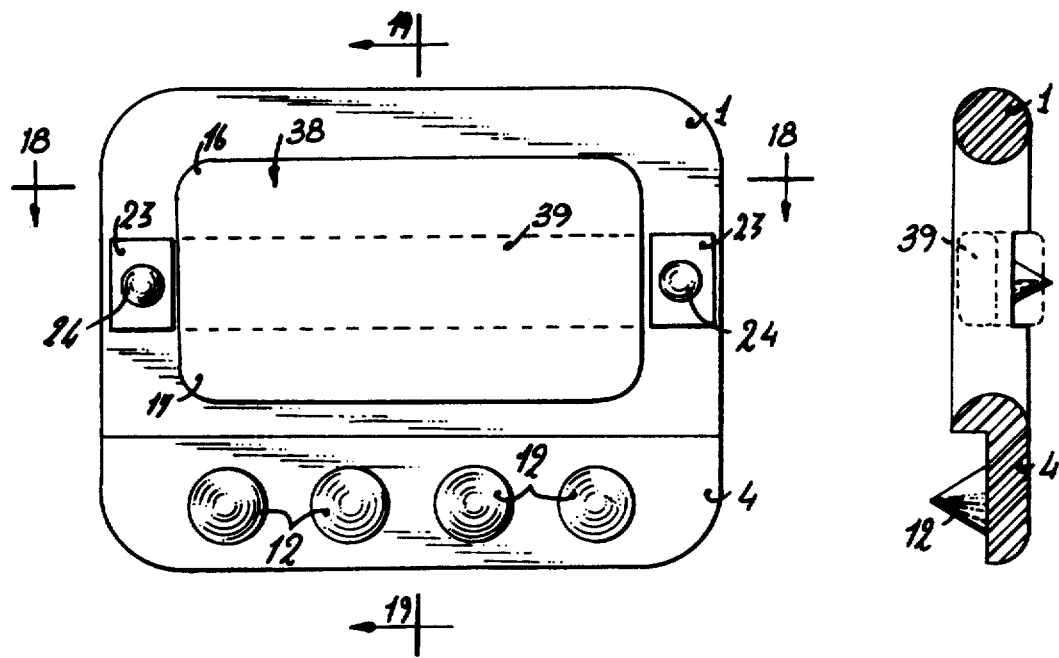
FIG.17
FIG.19

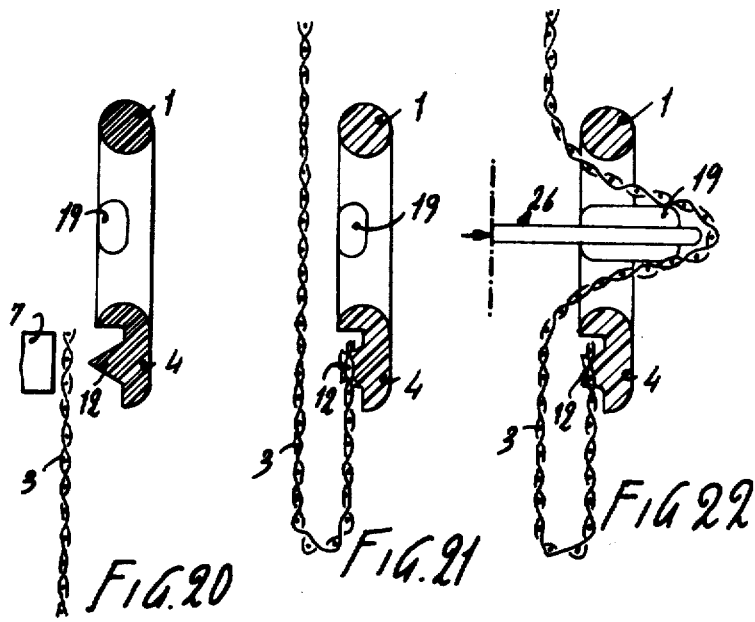
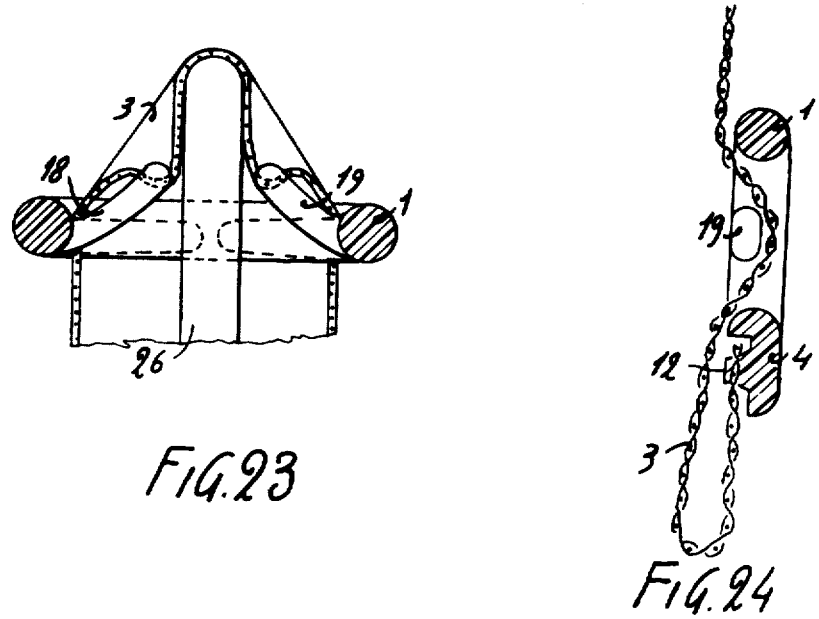

SLIDER FOR RIBBONS AND ASSEMBLING PROCESS THEREOF

This application is a division of my copending application Ser. No. 968,187, filed Dec. 11, 1978 now U.S. Pat. No. 4,315,351.

This invention relates to a slider for ribbons for use in girdle and clothing articles or outfits thereof, and is also concerned with a process for assembling and anchoring such a slider to a fabric, respectively to a ribbon, the slider being capable of sliding relatively thereto.

As well known, for example in girdle articles or generally in clothing articles, there is often a need of adjusting the length of a ribbon for a shoulder-strap, suspenders or the like, depending on the particular requirements. For example, in girdle articles the connection for the shoulder-straps to a clothing article and adjustment of the length thereof can be made by suitable sliders provided with proper slots for the passage or fastening of a ribbon making up the shoulder-strap.

At present, slider assembling and fastening are manually performed by slipping the ribbon or an extension of the fabric for a clothing article into a purposedly provided slot of the slider, whereupon the ribbon is bent over and attached by a cross seam; then, still manually the ribbon is caused to pass through a further slot of the slider.

Therefore, slider assembling is at present conditioned by the characteristics of the sliders, so that a mechanization or automation of the several assembling operations is extremely difficult, if not impossible.

For some applications, in addition to the problem of mechanizing and automating the slider assembling operations, a problem also exists as to aesthetics and comfort, particularly in girdle articles, since the thickness of the slider and folded up ribbon would appear beneath the garments and could however involve a rise of local inflammations due to friction against the skin.

Therefore, it is the object of the present invention to provide a slider and assembling process thereof to allow a complete automation and mechanization for the slider assembling operations, or the operations for connecting the slider to the fabric of a clothing article or generally of a ribbon, as well as the operations for inserting the ribbon into the slider slots. This offers substantial advantages from production standpoint, thereby allowing complete elimination of labor.

It is a further object of the present invention to provide a slider of the above-mentioned character, by means of which the thickness can be reduced at the connection zone to the fabric or ribbon, whereby the resulting decreased size would reduce the possibility of skin inflammation where a slider is slidably mounted in contact with the skin.

Thus, according to the invention, a process is provided for assembling a slider of the above-mentioned character to the fabric of a clothing article or outfits thereof, which slider is made of thermoplastic material and fitted with at least one slot for the passage and slide of a ribbon, the process according to the invention comprising the steps of contacting the fabric with a slider anchoring zone; generating ultrasonic vibrations causing partial melting for the thermoplastic material of the slider zone contacting the fabric; applying a pressure to the fabric and causing the diffusion of the molten thermoplastic material through the fabric loops for slider anchoring; and finally mechanically and automatically inserting the ribbon through the slider slot.

Further, according to the invention, there is provided a slider for ribbons and the like, comprising a body or member of thermoplastic material including a first flat portion defining at least one passage and slide slot for the ribbon, and also including a second portion for fastening to the fabric, this portion extending as a continuation of the former and being provided with one or more side projections for anchoring to a fabric by diffusion of the thermoplastic material through the fabric itself, according to the process above referred to.

Thus, the novel features of the present invention are concerned with the assembling of a slider to a ribbon and/or fabric of a similar clothing article, by using a particular configuration of the slider and taking advantage of the resiliency of the material embodying the slider for mechanizing the ribbon inserting operations, but also by unique and novel use of ultrasonic welding techniques. Thus, unlike known systems providing for melting both of the portions or elements to be welded, the invention provides the diffusion for the thermoplastic material of the slider through the fabric loops, so that the fabric is fixedly anchored to the slider. The thermoplastic material of the slider can be diffused through the fabric loops since the mechanical energy of ultrasounds, converting into melting heat for the thermoplastic material of the slider, does not affect the fabric as the latter, due to its resilient nature or material making up the fibers, is not subjected to substantial alterations.

The invention will now be further described by some exemplary sliders with reference to the accompanying drawings, in which.

Figure 9:
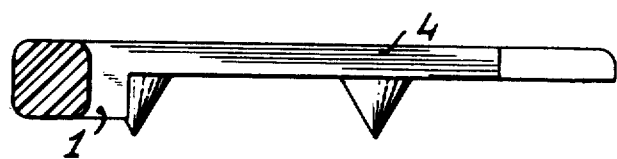
Figure 9:
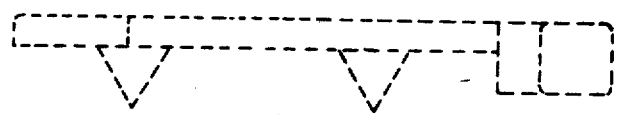
Figure 8:
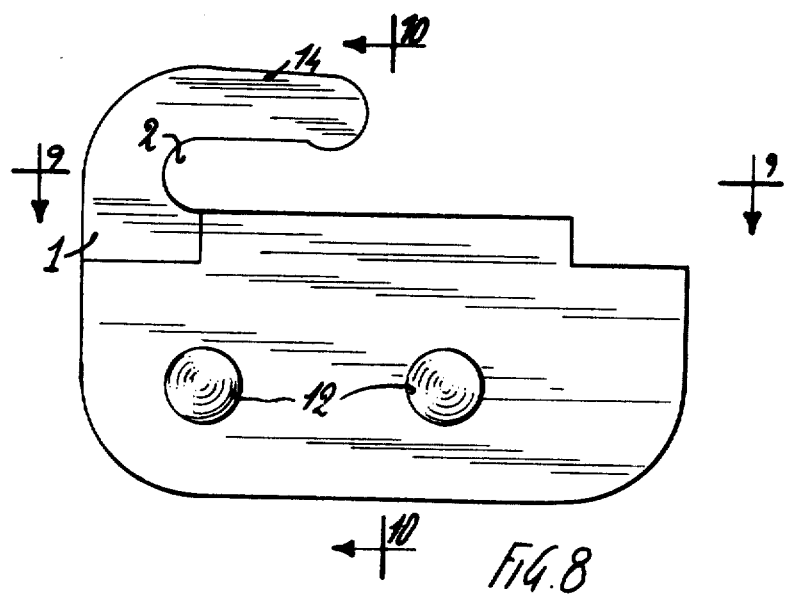
FIG. 8 is a view of a slider according to a third embodiment.
Figure 10:
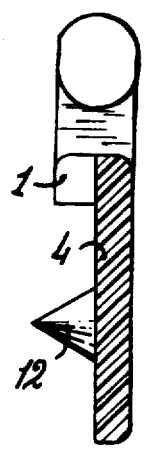
Figure 12:
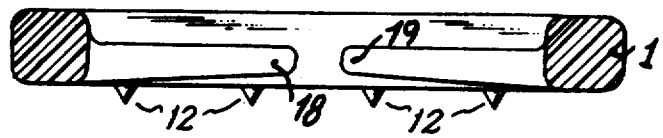
Figure 11:
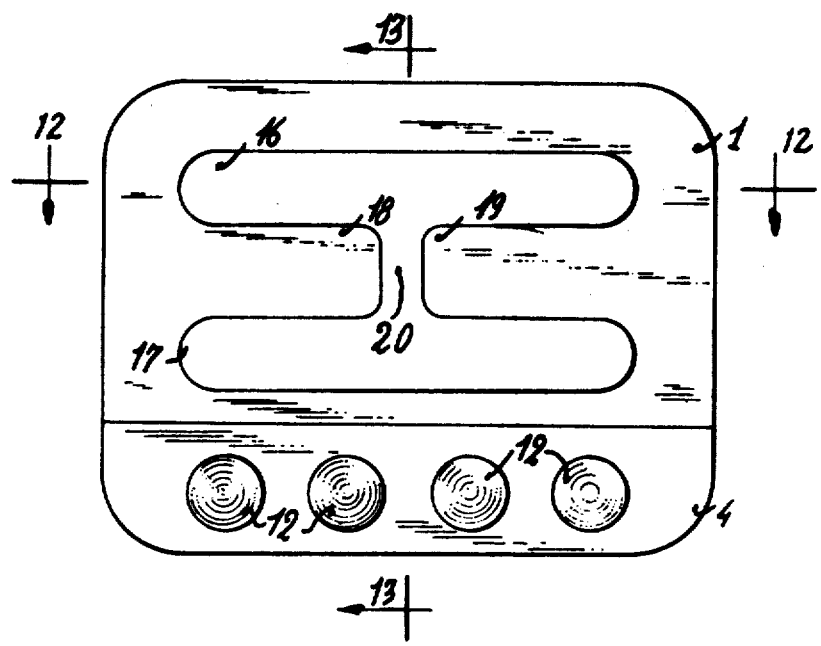
Figure 13:
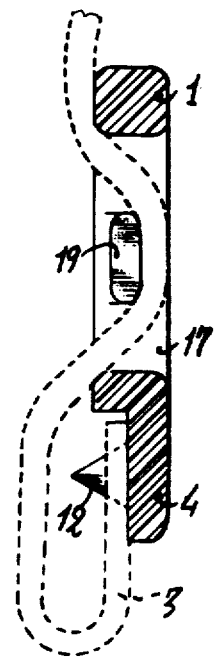
Figure 15:
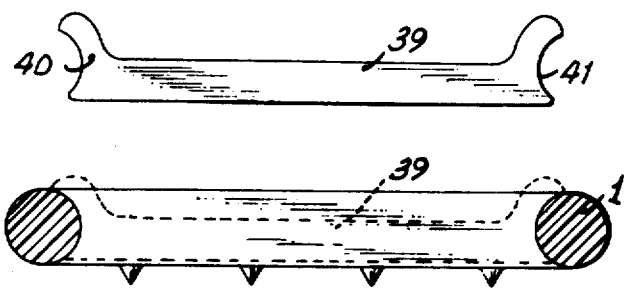
Figure 14:
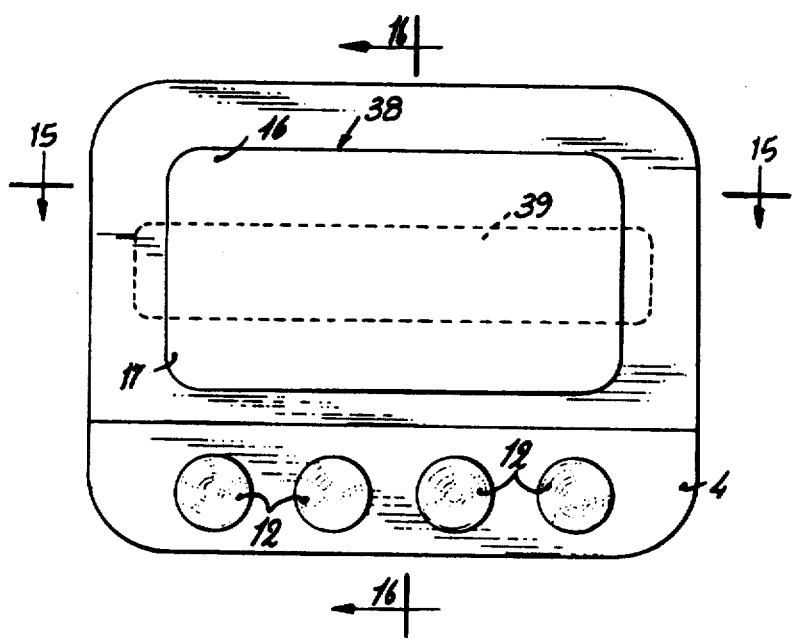
Figure 16:
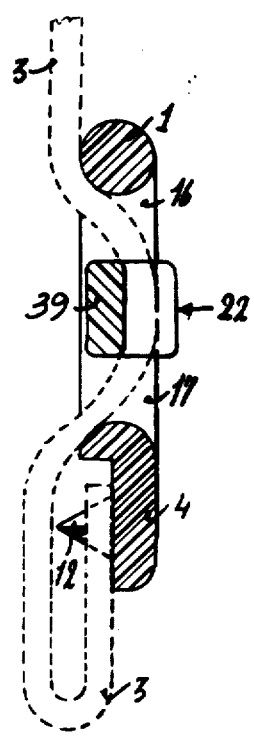

FIGS. 9 and 10 are cross sections substantially taken along lines 9—9 and 10—10, respectively, of FIG. 8;

FIG. 11 is a fourth embodiment of the slider;

FIG. 12 is a sectional view taken along line 12—12 of FIG. 11;

FIG. 13 is a sectional view taken along line 13—13 of FIG. 11;

FIG. 14 is a fifth embodiment of a slider according to the invention, wherein the slots are defined by a snapped-on cross member;

FIG. 15 is an exploded view of the slider, partly cut away according to line 15—15 of FIG. 14;

FIG. 16 is a cross section of the slider taken along line 16—16 of FIG. 14;

FIGS. 17, 18 and 19 are views similar to those of FIGS. 14 through 16, showing a substantially similar slider, but wherein the cross member defining the ribbon sliding slots is secured by ultrasonic welding;

FIGS. 20, 21 and 22 schematically show a sequence of operations as required for automatically assembling a slider, such as that shown in FIG. 11, to a fabric ribbon; and FIGS. 23 and 24 show a ribbon as being introduced between the slider slots.

Referring to the exemplary embodiment of FIGS. 1 through 4, the invention will be described for illustration according to its general features.

As shown in said figures, a slider entirely made of thermoplastic material substantially comprises a first flat portion 1, herein defining a cross slot 2 for the passage or relative slide of a fabric ribbon 3, schematically shown by dashed lines. The slider further comprises a second portion 4 for anchoring or fastening to any clothing article or outfit thereof, as schematically shown at 6 of FIG. 2, the anchoring portion 4 extending as a continuation of said first flat portion 1 and on one side thereof being provided with a transverse projection 5 for connection to fabric 6 by an ultrasonic welding process, as hereinafter explained with reference to the enlarged views of FIGS. 3 and 4 showing a cross section of anchoring projection 5 and fabric 6.

Figure 1:
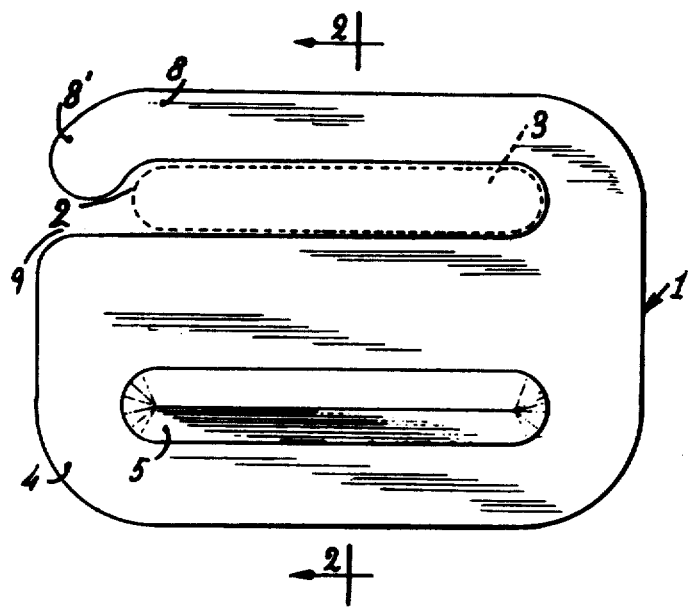
FIG. 1 is a view showing a slider according to a first embodiment.
Figure 2:
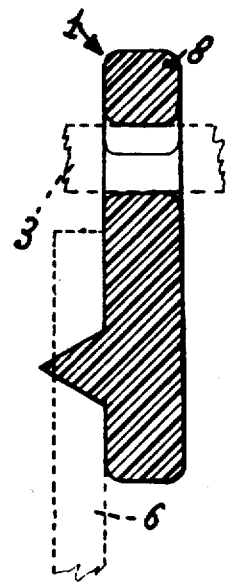
FIG. 2 is a cross section taken along line 2—2 of FIG. 1.
Figure 3:
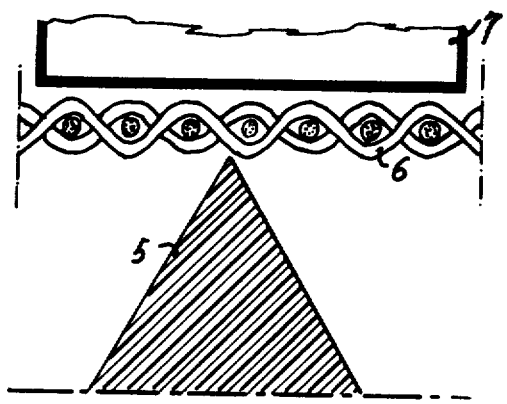
FIGS. 3 and 4 are enlarged views of a portion of the slider and fabric showing the ultrasonic welding process according to the invention.
Figure 4:
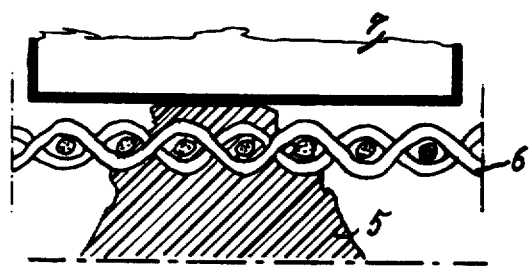

As shown in FIG. 3, the fabric is initially positioned in contact with projection 5 provided at slider anchoring zone 4, whereupon a device 7 for generating ultrasonic vibrations is brought near the fabric 6 to press the latter against the slider projection 5. Since said fabric 6 has resilient characteristics and accordingly is not subjected to alterations under the effect of the ultrasonic vibrations generated by device 7, while the triangular or pointed shape of projection 5 constitutes an energy directing means, such a projection is heated, reaching a temperature near or corresponding to the melting temperature for the thermoplastic material comprising it. Since device 7 presses the fabric against projection 5, the molten material of the latter penetrates through the loops of fabric 6, as outlined in the enlarged view of FIG. 4, firmly anchoring to said fabric upon subsequent cooling.

After anchoring said slider to the fabric, ribbon 3 can be passed through slot 2, as above specified. Owing to the particular configuration of the slider slot, also this operation can be mechanized, as hereinafter explained. Thus, it will be seen from FIGS. 1 and 2 that slot 2 is an open type of slot, or formed between the slider edge opposite to the fabric sealing portion 4 and a resilient arm 8 extending from one to the other side of the slider, suitably spaced apart from said edge, terminating with its end 8' slightly enlarged and curved to said slider edge. Thus, a slit 9 is provided facilitating the introduction of ribbon 3, such as by a suitable punch (not shown), taking advantage of the resiliency of the material of which said arm 8 is made for facilitating the ribbon passage. This is extremely beneficial because of offering the advantage of a complete mechanization and automation for slider assembling as above referred to, and also allows a decrease in overall sizes of the assembled slider, since there is no need of folding up and seaming said fabric 6 to a slider slot as otherwise required with conventional sliders.

Figure 5:
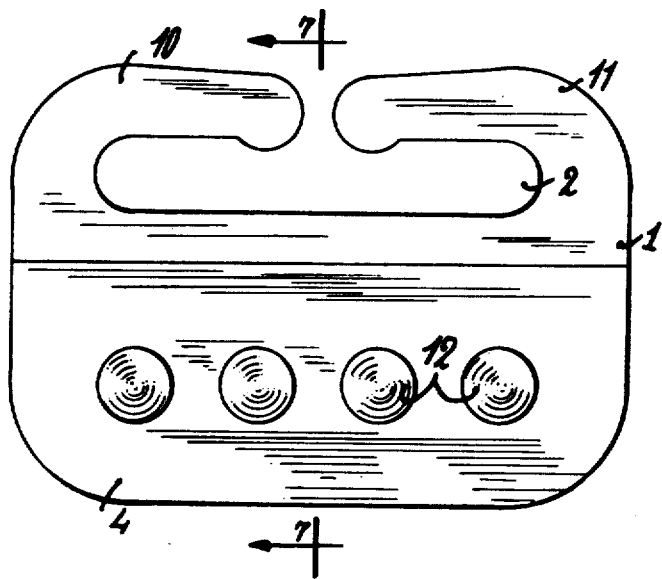
FIG. 5 is a view of a slider according to a second embodiment.
Figure 7:
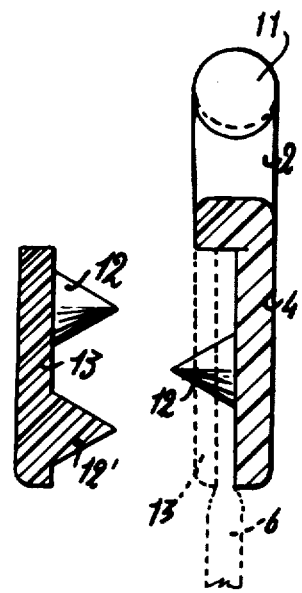
FIG. 7 is a cross section of the slider and plate substantially taken along lines 7—7 of FIGS. 5 and 6.
Figure 6:
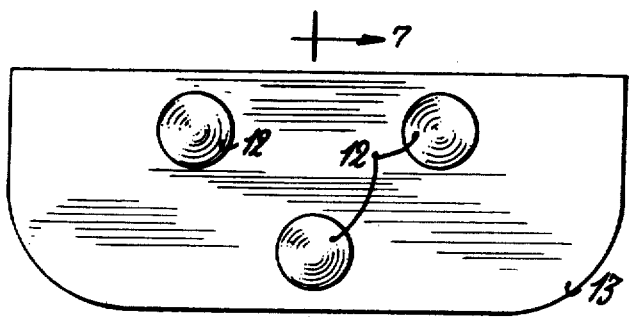
FIG. 6 is a view showing a covering plate for the welding zone of the slider shown in FIG. 5.

Referring now to FIGS. 5, 6 and 7, a second embodiment of a slider according to the invention will be described. In addition to providing a modification to the configuration of the ribbon passage or slide slot, this second embodiment of the slider has the fabric sealing portion 4 modified with respect to the embodiment of FIG. 1 to provide a further decrease in overall sizes which, in this case, can be confined within the slider thickness.

Like the slider shown in the preceding figures of the drawings, the slider of FIGS. 5 through 7 still comprises a portion 1 defining a ribbon passage or slide slot 2 and a portion 4 for ultrasonic welding to a fabric 6, as previously referred to. The difference over the preceding case resides now in that said slot 2 is defined by two opposite resilient arms 10 and 11 cantilevered extending to each other from the opposite sides of the slider and parallel to the edge of the latter opposite to said fabric welding portion 4. Arms 10 and 11 terminate at a short distance from each other to allow for automatic introduction of a ribbon as in the former case by a suitable punch, taking advantage of the resiliency of the material comprising said slider.

The slider shown in FIGS. 5 through 7 also provides a fabric welding portion 4 having a less thickness than portion 1, as shown in the sectional view of FIG. 7. Particularly, this slider portion 4 is an extension of portion 1 that is coplanar to the side face of the slider opposite to the fabric welding face. Therefore, as shown in FIGS. 5 and 7, the slider extension 4 always has fabric welding or sealing projections, in the particular case comprising conical tips 12 aligned transversely of the slider. The approach of FIGS. 5-7 allows a substantial decrease in thicknesses at the fabric welding or sealing zone, since the thickness of fabric 6 is confined within the slider thickness in view of the decrease in thickness of portion 4.

Finally, in FIGS. 6 and 7 the use is shown of a plate 13, namely a weld or seal covering plate, which plate 13 is separated from the slider and likewise the latter has wedge-like projections 12 for welding or sealing to the fabric, which are at locations spaced apart from the corresponding projections 12 of the slider. The use of said plate 13 for covering the sealed portion further enables an increase in slider strength without any increase in overall sizes. Thus, the thickness for plate 13 and slider portion 4 shall be calculated to leave therebetween a space sufficient to accommodate the edge of fabric 6 to which the slider is welded. This is schematically shown by dashed lines in FIG. 7 of the drawings.

Referring to FIGS. 8, 9 and 10, a third embodiment of a slider according to the invention will now be described, providing the combined use of two similar slider elements that are superimposed to each other.

In the example shown in these figures, the slider element still comprises a portion 1 defining a ribbon slide slot and a portion 4 of a reduced thickness for ultrasonic welding to a fabric, as above set forth. However, it will be seen from FIG. 8 that slider portion 1 is limited to a slider corner and has an arm 14 extending parallel to the upper edge for a length equal to or slightly less than half the width of said slider.

Thus, unlike the preceding cases, the slider element of FIG. 8 defines only part of ribbon slide slot 2, as the complete slider is obtained by superimposing two identical elements rotated by 180° relative to each other, as schematically shown by dashed lines in the perspective and plan views, respectively, of FIGS. 8 and 9 of the accompanying drawings. Therefore, portion 1 for each slider element is made to have at the corner opposite to portion 1 a recess accommodating the contour of the latter for correct positioning and superimposition between the slider elements. This particular approach for the slider is advantageous as allowing a different mechanization of the ribbon inserting operations, since the ribbon can be inserted prior to connection of the two slider elements and concurrently with welding or sealing to the fabric. However, the approach of FIGS. 8, 9 and 10 does not exclude slider assembling and ribbon insertion by means of a punch, as in the former cases.

In the examples shown in the preceding figures of the drawings, a "simple" type of slider has been depicted, that is a slider having a single ribbon passage and slide slot, as above referred to. The sliders of the examples shown in FIGS. 1 through 10 can be used, for example, to connect a shoulder-strap to a clothing article, at the same time allowing the shoulder-strap ribbon to slide relatively to the slider for adjusting the length thereof.

A further embodiment of a slider according to the invention is shown in FIGS. 11 through 13 of the accompanying drawings. As shown in FIG. 11, the slider still comprises a first portion 1 now defining two transverse ribbon slide slots 16 and 17, and a second portion 4 of a reduced thickness, having conical projections 12 for ultrasonic welding or sealing to an end of ribbon 3, as schematically shown in the sectional view of FIG. 13. This type of slider will be hereinafter referred to as a "double" slider in order to distinguish it from that of the preceding examples.

The two ribbon passage slots 16 and 17 are separated by an intermediate cross member, in the particular case formed by two opposing arms 18 and 19 extending in the slider plane and leaving therebetween an intermediate slit 20 for allowing a resilient flexure of said arms in a direction perpendicular to the slider plane. Thus, according to this embodiment of the slider, ribbon 3 is caused to pass through slots 16 and 17, straddling said arms 18 and 19 for a relative slide.

FIGS. 14 through 16 show a further variant of the "double" slider. In the example shown in these figures, the slider still has a portion 1 defining two ribbon passage and slide slots, and a portion 4 of a reduced thickness, provided with projections 12 for ultrasonic welding or sealing to an end of ribbon 3.

Unlike the preceding case, said ribbon passage slots 16 and 17 are now obtained by providing said slider portion 1 with a wide rectangular aperture 38, transversely of which at intermediate position a cross member 39 is secured and defines with aperture 38 two slots 16 and 17.

In this example, cross member 39 is secured to the side edges of aperture 38 by a snap connection system. To this purpose, the cross member ends 40 and 41 have concave surface accommodating and snap engaging by elastic deformation of the plastic material to the side edges of aperture 38. The assembled arrangement of cross member 39 is shown by dashed line in FIG. 15 and in FIG. 14, respectively. Therefore, the slider according to the example of FIGS. 14, 15 and 16 allows a different mechanization of the ribbon insertion operations, as such a ribbon can be bent over to form a loop, mechanically introduced by a punch (not shown) into the slider aperture 38 free of said cross member 39. Cross member 39 is then applied and clamped in place by exerting a push action in the direction of arrow 22 of FIG. 16 until snap engaging by its ends with the side edges of said slit or aperture 38. Thus, two separate slots are defined, through which ribbon 3 can slide.

FIGS. 17 through 19 show a slider substantially identical to that of FIGS. 14 through 16 with the only difference that cross bar or member 39 is now secured to the edges of slider aperture 38 by ultrasonic welding. Welding of bar 39 can be made concurrently with that of the slider to the ribbon. Therefore, the slider of FIGS. 17 through 19 has been provided on the sides of aperture 38 with two flattened zones 23, each of which provided with a conical projection 24 defining as energy directing means for ultrasonic welding of cross member 39. In turn, said cross member has its ends 25 suitably shaped with planar surfaces to accommodate planar surfaces 23 for welding to the slider. Otherwise, the slider of FIGS. 17 through 19 is substantially similar to that of the preceding example.

Thus, from the foregoing and as shown in the accompanying drawings it will be appreciated that sliders of thermoplastic material have been provided, by means of which the assembling operations of the sliders can be completely mechanized and automated, that is the connection of the slider to a fabric or ribbon according to requirements, and insertion operations of a ribbon, belt or the like through the slider slots. This possibility of mechanizing the assembling operations for the slider are schematically summarized in FIGS. 20 through 24 of the accompanying drawings. Thus, in FIG. 20 a double slider is shown, for example of the type previously described in connection with FIGS. 11 through 13, a fabric ribbon 3, of which one end is to be ultrasonically welded to projections 12 of slider portion 4, as well as an electrode 7 for ultrasonic welding as previously described with reference to FIGS. 3 and 4 of the accompanying drawings.

FIG. 21 shows the end of ribbon 3 welded to the slider, with the plastic material of projections 12 penetrated and firmly anchored to the loops of the fabric ribbon.

On the other hand, FIGS. 22 and 23 show ribbon 3 as being introduced between the slider slots. As shown in the two sectional views along different planes of FIGS. 22 and 23, a punch urges the loop of ribbon 3 inside the slider slots, laterally bending arms 18 and 19 until the ribbon loop completely passes said arms. After retraction of punch 26, due to the material resiliency said arms 18 and 19 will move back to the original position thereof, as schematically shown by dashed lines in FIG. 23, and accordingly said ribbon 3 is automatically inserted, with the slider capable of sliding along the ribbon, this condition being clearly shown in FIG. 24.

What is claimed is:

1. A process for assembling a ribbon and a ribbon slider including a ribbon anchoring portion and a portion defining two slots separated by flexible opposite arms, said process comprising the steps of:
   (a) securing a said ribbon to said slider anchoring portion by welding,
   (b) pushing a punch, with a portion of said ribbon thereon, against said arms, temporarily bending said arms, until said ribbon passes beyond said arms, and
   (c) retracting said punch, allowing said arms to recover an undeformed condition and leaving said ribbon threaded into said slots and arranged beyond said arms.

2. A process as in claim 1, wherein said slider is made of thermoplastic material and said welding is an ultrasonic welding, comprising the steps of partially melting the material of projections on said ribbon anchoring portion, and diffusing said molten thermoplastic material into an end portion of said ribbon.

3. A process as in claim 1, and welding one end of said ribbon to said anchoring portion with a length of said ribbon extending from said one end away from said arms and then back to said arms, thereby to form a loop in the ribbon between said one end thereof and said arms.

4. A process for assembling a ribbon and a ribbon slider including a ribbon anchoring portion and a portion defining two slots separated by flexible opposite arms, said process comprising the steps of:
 (a) pushing a punch, with a portion of a said ribbon thereon, against said arms, temporarily bending said arms, until said ribbon passes beyond said arms,
 (b) retracting said punch, allowing said arms to recover an undeformed condition and leaving said ribbon threaded into said slots and arranged beyond said arms, and
 (c) securing said ribbon to said slider anchoring portion by welding.

* * * * *